May 9, 1961  R. H. MADDEN  2,983,012
CABLE CLAMP

Filed Dec. 22, 1958  2 Sheets-Sheet 1

Robert H. Madden
INVENTOR.

BY *Clarence A. O'Brien*
and *Harvey B. Jacobson*
Attorneys

May 9, 1961 R. H. MADDEN 2,983,012
CABLE CLAMP
Filed Dec. 22, 1958 2 Sheets-Sheet 2
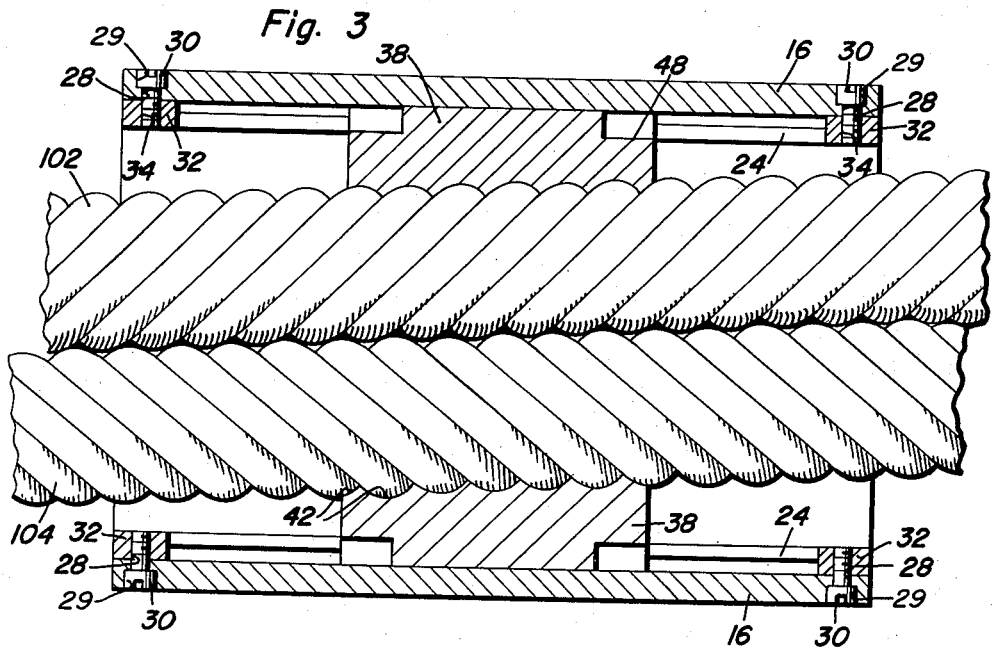
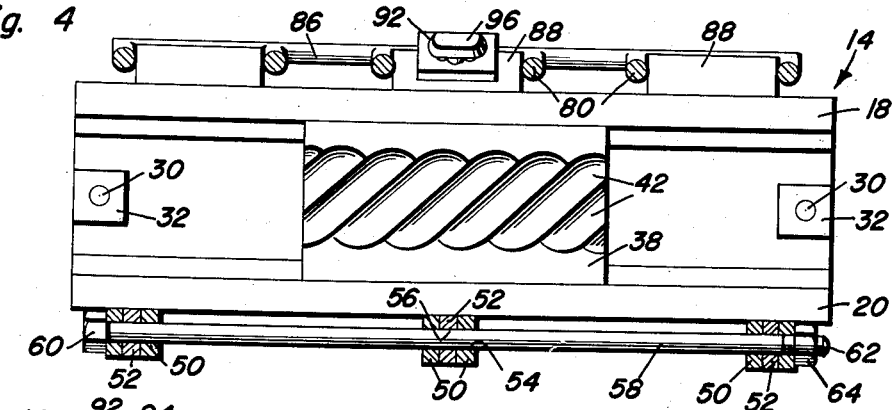
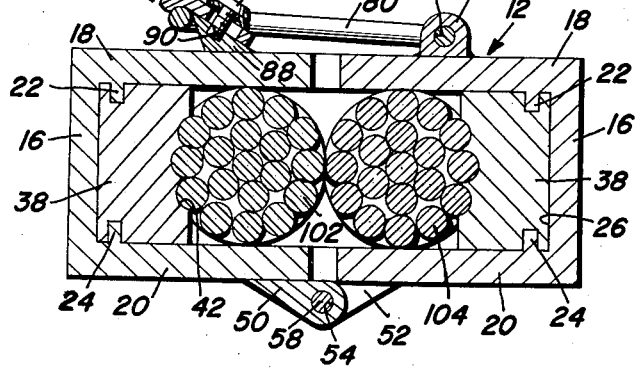
Robert H. Madden
INVENTOR.

United States Patent Office 2,983,012
Patented May 9, 1961

2,983,012

CABLE CLAMP

Robert H. Madden, Houston, Tex.
(P.O. Box 94, Matagorda, Tex.)

Filed Dec. 22, 1958, Ser. No. 782,290

3 Claims. (Cl. 24—126)

This invention relates generally to devices for splicing cables and the like, and more particularly to a new and useful improvement in cable clamps.

Heretofore in this art when wedge-type cable clamps were used, two cable strands to be clamped were passed through the clamp which used large gripping areas having abrasive surfaces thereon to more firmly grasp the cable. While some of these devices held the cables fast together as desired, they always would injure, mar and tear the cable to such an extent that the useful life thereof was greatly diminished. Furthermore, in the devices used heretofore, the cable lengths to be spliced, were not in direct contact with each other but were separated by blocks or parts of the cable itself. This gave the added disadvantage of allowing the clamp, when the cables were each being pulled in a different direction, to turn at an angle with respect to the longitudinal length of the cables. This was caused by the fact that the cables were not in contact with each other, and when the forces were applied, the clamp would necessarily twist so that the shortest distance possible would be located between the application points on the clamp of the two forces. This also is disadvantageous since it again decreases the useful life of the cable.

It is therefore one of the primary objects of this invention to provide a cable clamp which will hold cable lengths spliced together in an efficient manner, and without injury to the cables, thereby allowing a longer use of the cables.

Another object of this invention is to provide a cable clamp of the character described wherein the separate lengths of cable to be clamped are in abutting relation to each other, so that the previously mentioned disadvantage of having the clamp disposed at an angle with respect to the longitudinal length of the cables is obviated, while providing each cable with another cable as one of the clamping surfaces, thereby doing less injury to the cables themselves.

Still a further object of this invention is to provide a device of the character described wherein a clamp is provided for joining two cables together in an effective and efficient manner, and which may be simply and quickly applied and removed so that no unnecessary effort and time need be expended when splicing cables.

Yet a further object of this invention is to provide a device of the character described wherein the clamping of the cables together is proportional to the strain on the cables, so that as a greater amount of force is applied to the cables, the clamping pressure becomes greater, thereby minimizing the possibility of the cable splice becoming separated.

An even further object of this invention is to provide a simple and inexpensive device and yet one which is exceedingly effective for the purpose for which it is designed.

This invention contemplates the use of a pivoted housing comprised of two pivotally connected sections in which the cables to be spliced are to be disposed. It is to be here noted that when the term "cable splice" is used, this includes the connecting of two separate cables together, as well as forming a loop in a single cable and attaching the outer end thereof to an intermediate portion of the cable. Each section of the housing is elongated and of a substantially C-shaped cross-section, with the pivot being disposed at the bottom of the lower legs of the respective sections. Disposed on the inner surface of the bight portions of the respective C-shaped sections, are guide ways which slidingly accommodate opposing wedge-shaped and complementary blocks. Stops are disposed in the guide ways at both ends of the sections so that the blocks may not be removed from the housing unless the stops are first removed. Each of the blocks is provided with grooved inner surfaces so that when the cable is disposed along the block, certain of the strands of the cable will be disposed within the grooves of the block thereby lessening the effect of the deformation of the cable, which usually occurs in clamping or splicing cables together. The upper leg of one of these sections has a spring lock thereon, and the other section has a pivoted latch constructed of an open framework, which is engaged with the spring lock to lock the sections together.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a horizontal sectional view taken centrally through the device illustrated in Figure 1;

Figure 4 is a vertical sectional view taken through the device with the cables being removed therefrom;

Figure 5 is a vertical sectional view illustrating the C-shaped cross-section of the respective sections, and taken through the device illustrated in Figure 1.

Figure 1:
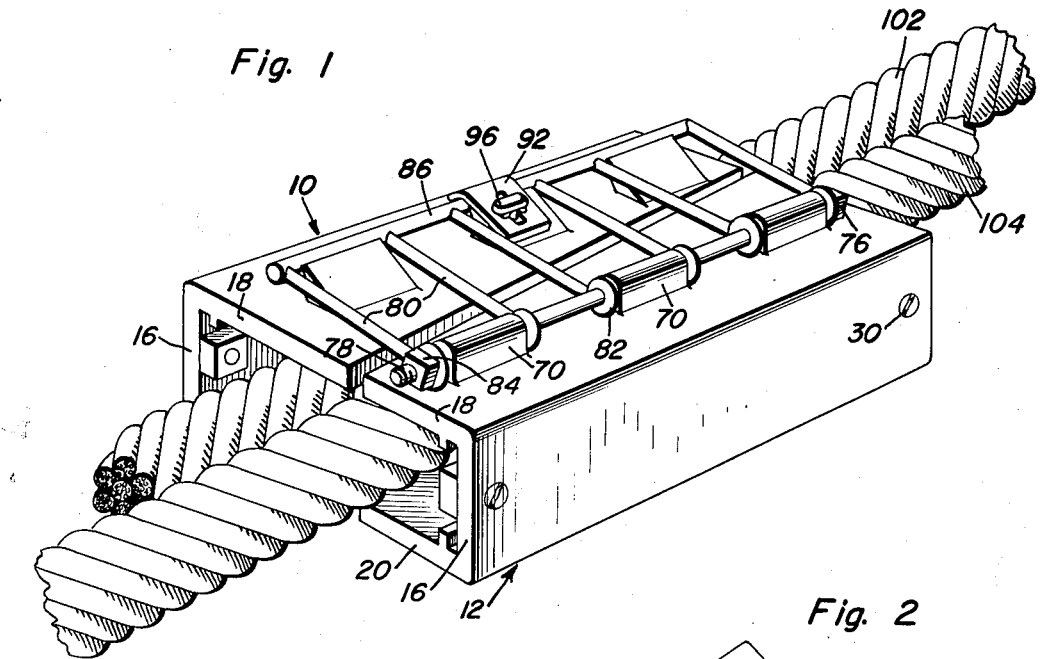
Figure 1 is a perspective view of the invention illustrating the same clamping two cables together.

Referring now more specifically to the drawings, the numeral 10 generally designates the cable clamp comprising the present invention. This clamp is constructed of a two-part or sectional housing designated by numerals 12 and 14 respectively. The housing sections 12 and 14 are almost of identical construction and therefore identical numerals will be used for both.

Each housing section is constructed of an elongated C-shaped member having a bight portion 16, and upper and lower leg portions 18 and 20 respectively. Projecting from the inner surfaces of the upper and lower legs 18 and 20 respectively, and adjacent the bight portion 16 are elongated flanges 22 and 24, which serve to provide a guideway or undercut channel 26. This undercut channel 26 will be used for a purpose which will be more fully explained below. At both ends of the bight portion 16, and formed horizontally therethrough, are bores 28 provided with counterbores 29, each receiving a bolt 30, with the head of the bolt being disposed in the counterbore, so that the top of the head is flush with the outersurface of bight portion 16 and the shank of the bolt protrudes inwardly from the bore 28. Stop blocks 32 having threaded openings 34 formed therethrough, are held in position by being threaded onto the shanks of the bolts 30.

Figure 6:
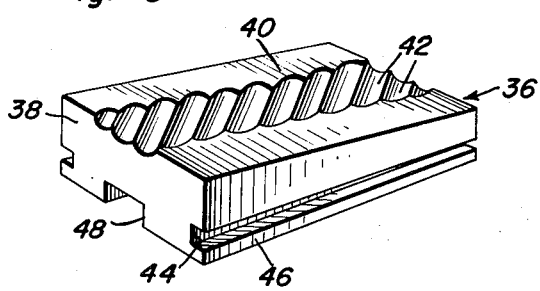
Figure 6 is a perspective view of one of the wedge-shaped blocks used as a clamping element in the present invention.

Wedge shaped clamping blocks 36 are mounted for sliding movement within the undercut channels 26, and the stop blocks 32 prevent the wedge blocks 36 from being removed from the housing. Each of the blocks 36 is constructed of an elongated body 38 which, as may be seen in Figure 6, is thicker at one end than at the other, to provide the wedge-shape. On the cable engaging surface 40, grooves 42 are cut therein for accommodating a portion of the periphery of the strands of the cable, so that the wedge block may more properly clamp the cable without injury thereto. The outer sides of block 38 are grooved as at 44 to provide extending lips 46 on the outer edge thereof which are to be engaged between the flanges 22 and 24, and bight portions 16, so that the block 38 is slidingly engaged within the housing. At both ends of the outer surface of the blocks 38, cut-out portions 48 are formed, which accommodate the stop blocks, so that the end surface of the block 38 will be flush with the end of the housing, when the block is in its limited position.

As may be seen in Figure 3, two of these blocks 38 are used, and each of them opposes the other and is complementary thereto, so that the larger portion of one block is opposite the smaller portion of the other block.

As was previously mentioned, the housing sections are pivoted together by having a hinge connected to the inner portions of the lower legs 20. Fingers 50 project downwardly from the lower surface of lower leg 20 of housing section 14, and fingers 52 project downwardly and inwardly from the lower surface of lower leg 20 on the housing section 12. A horizontal opening 54 is formed through fingers 50, and a corresponding and aligned opening 56 is formed through fingers 52. An elongated pin or bolt 58 having a head 60 on one end, is threaded as at 62 on the other end thereof and passed through the aligned openings 54 and 56. A nut 64 is threaded onto the threaded end 62, so that the two housing sections 12 and 14 are connected together.

On the upper surface of upper leg 18 of housing section 12, are mounted in longitudinal alignment, a plurality of spaced bearings 70 having coaxial openings 72 formed therethrough. An elongated pin or bolt 74 is passed through the aligned openings 72 and has a head 76 on one end thereof and is threaded at 78 on the other end thereof. A plurality of bars 80 having eyes 82 disposed on the pin 74, are pivotally connected thereto. A nut 84 is threaded onto the end 78 of the pin or bolt 74, and thus the bars 80 are locked thereon. A connecting bar 86 is affixed to the outer or free ends of the rods 80, so that a unitary structure is formed, which is pivotally connected to bolt 74. Mounted on the upper surface of upper leg 18 of the other housing section 14, are a plurality of triangular blocks 88, which have one side fastened to the leg 18, and another side facing its bight portion 16, and at an angle thereto. A threaded opening 90 is formed in the third surface of one of these blocks, and a latch 92 and lock washer 94 are locked thereon by means of a bolt 96 which is threaded into opening 90. Thus, when it is desired to lock the housing sections into a unitary structure, it is merely necessary to pivot the bar 86 onto the latch 92, and when force is applied, the lower end of latch 92 will move upwardly against the lock washer 94, and permit the bar 86 to move past the latch 92. Since the latch 92 has a curved or hook portion, the bar will be locked thereunder and may not be removed therefrom, until the bolt 96 is loosened and the latch 92 moved.

Figure 2:
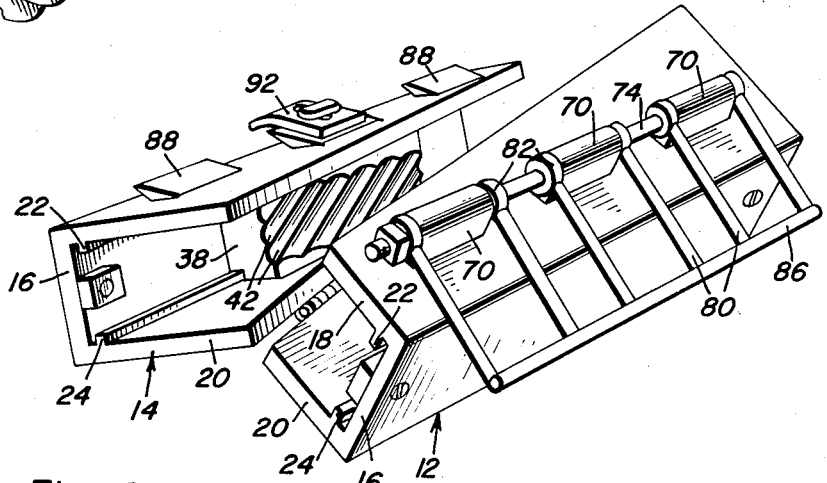
Figure 2 is another perspective view of the device illustrated in Figure 1 illustrating it in a position wherein the cables are removed and the housing sections are separated.

In use, the device may be set up as illustrated in Figure 2, wherein the two cables 102 and 104, or two portions of the same cable, when it is desired to form a loop, are extended through the housing, and between the blocks 38. Then, the bar 86 is pivoted into a position wherein it is locked beneath latch 92. Then, as viewed in Figure 3, as cable 102 is pulled to the right and cable 104 pulled to the left, it may be seen that the blocks 38 will move therewith and tighten the cables upon each other and between the respective blocks 38, so that upon the application of more force, a tighter and more effective clamping action is maintained. Since the cables are disposed within the grooves 42 of the blocks and abut against each other within the housing, there is little chance for damaging of the cables themselves. Furthermore, since the cables lie in abutting relation, the previously mentioned disadvantage of other cable clamps, of being turned at an angle with respect to the longitudinal axis of the cable when tension is applied, is eliminated. The stop blocks prevent the removal of wedge blocks 38 from the housing unless the bolts 30 are first removed.

It may now be seen that there has been herein shown and described a new and improved type of cable clamp which fulfills all of the previously mentioned objects.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a cable clamp for securing together two parts of a cable, the combination of a housing comprising a pair of elongated complemental half-sections of a C-shaped cross-section each having a bight portion and upper and lower leg portions, sets of mutually overlapped ears provided on the lower leg portions of said half-sections exteriorly of the housing and formed with coaxial apertures, a hinge pin extending through the apertures in said ears and connecting said half-sections together for opening and closing movement, a swingable latch member provided on the upper leg portion of one of said half-sections, a latch element provided on the upper leg portion of the other half-section and separably engageable by said latch member whereby to lock the half-sections in their closed position, a pair of opposing cable engaging wedge blocks slidable longitudinally in the respective half-sections, elongated guide rails provided in said housing on the upper and lower leg portions adjacent the bight portions of said half-sections, said wedge blocks being formed with longitudinal grooves slidably receiving said rails, and removable stop blocks secured to the bight portions of said half-sections at the ends of said housing between said guide rails, said stop blocks being engageable with said wedge blocks to limit the longitudinal sliding movement of the latter in the housing.

2. The device as defined in claim 1 together with a keeper provided on said latch element and releasably engageable with said latch member whereby to sustain the latter in its latched position.

3. The device as defined in claim 1 wherein end portions of said wedge blocks between said grooves are provided with recesses receiving said stop blocks when the wedge blocks are slid to a position flush with the ends of said housing.

References Cited in the file of this patent

UNITED STATES PATENTS

| | | |
|---|---|---|
| 482,975 | Cope | Sept. 20, 1892 |
| 633,632 | Wilson | Sept. 26, 1899 |
| 1,457,307 | Kerns | June 5, 1923 |
| 1,625,774 | Sadler | Apr. 19, 1927 |
| 1,945,438 | Landahl | Jan. 30, 1934 |
| 2,220,203 | Branin | Nov. 5, 1940 |
| 2,291,903 | Kemper | Aug. 4, 1942 |

FOREIGN PATENTS

| | | |
|---|---|---|
| 475,664 | France | Mar. 15, 1915 |
| 995,265 | France | Aug. 14, 1951 |